(12) United States Patent
Zevenbergen

(10) Patent No.: US 9,868,214 B2
(45) Date of Patent: Jan. 16, 2018

(54) LOCALIZATION OF A MOBILE SYSTEM

(71) Applicant: X Development LLC, Mountain View, CA (US)

(72) Inventor: John Zevenbergen, Saratoga, CA (US)

(73) Assignee: X Development LLC, Mountain View, CA (US)

( * ) Notice: Subject to any disclaimer, the term of this patent is extended or adjusted under 35 U.S.C. 154(b) by 27 days.

(21) Appl. No.: 15/187,582

(22) Filed: Jun. 20, 2016

(65) Prior Publication Data

US 2017/0361465 A1    Dec. 21, 2017

(51) Int. Cl.
*G06F 19/00* (2011.01)
*B25J 9/16* (2006.01)

(52) U.S. Cl.
CPC ... *B25J 9/1676* (2013.01); *G05B 2219/40202* (2013.01)

(58) Field of Classification Search
CPC .................... B25J 9/1676; G05B 2219/40202
USPC .......................................................... 700/253
See application file for complete search history.

(56) References Cited

U.S. PATENT DOCUMENTS

| | | | |
|---|---|---|---|
| 7,321,305 B2 | 1/2008 | Gollu | |
| 8,698,893 B2 | 4/2014 | Lohmann | |
| 8,965,561 B2 | 2/2015 | Jacobus et al. | |
| 9,446,518 B1 * | 9/2016 | Blankespoor | B25J 9/1676 |
| 9,452,531 B2 * | 9/2016 | Kikkeri | B25J 9/1676 |
| 9,522,471 B2 * | 12/2016 | Kuffner, Jr. | B25J 9/1676 |
| 9,623,560 B1 * | 4/2017 | Theobald | B25J 9/1676 |
| 9,694,497 B2 * | 7/2017 | Burmeister | B25J 9/1676 |
| 9,744,672 B2 * | 8/2017 | Sun | B25J 11/0005 |
| 2004/0069850 A1 | 4/2004 | De Wilde | |
| 2006/0049939 A1 | 3/2006 | Haberer et al. | |
| 2007/0205861 A1 | 9/2007 | Nair et al. | |
| 2008/0167817 A1 | 7/2008 | Hessler et al. | |
| 2014/0031981 A1 * | 1/2014 | Fernando | G05D 1/024 700/253 |

(Continued)

FOREIGN PATENT DOCUMENTS

| | | |
|---|---|---|
| EP | 2395274 B1 | 4/2015 |
| KR | 10-2010-0050865 | 5/2010 |
| WO | 2009/155948 A1 | 12/2009 |

OTHER PUBLICATIONS

International Searching Authority, International Search Report and Written Opinion of the International Searching Authority for PCT Pat. App. No. PCT/US2017/033426, dated Aug. 16, 2017.

*Primary Examiner* — Ronnie Mancho
(74) *Attorney, Agent, or Firm* — McDonnell Boehnen Hulbert & Berghoff LLP

(57) ABSTRACT

Systems and methods related to localizing mobile robotic devices are provided. A control system can receive a request for a particular mobile robotic device (PMRD) to travel between a first area and a cell area. After receiving the request, the control system can disable a presence sensor detecting objects traveling between the first area and the cell area. The control system can receive, from one or more identification sensors, sensor data identifying a mobile robotic device that has moved into the cell area based on identifiers of the mobile robotic device. The control system can verify that sensor data indicates the PMRD is in the cell area. After verifying that the PMRD is in the cell area, the control system can: disable the PMRD, enable the presence sensor, and indicate that the PMRD is disabled in the cell area.

20 Claims, 10 Drawing Sheets

(56) References Cited

U.S. PATENT DOCUMENTS

| | | | |
|---|---|---|---|
| 2014/0074287 A1* | 3/2014 | LaFary | G06N 3/008 700/253 |
| 2014/0156071 A1* | 6/2014 | Hong | G05D 1/0234 700/253 |
| 2015/0081095 A1* | 3/2015 | Shiraki | B25J 9/047 700/253 |
| 2015/0088310 A1* | 3/2015 | Pinter | G06Q 50/22 700/253 |
| 2015/0112483 A1* | 4/2015 | Mougin | B25J 9/1676 700/253 |
| 2015/0205297 A1 | 7/2015 | Stevens et al. | |

* cited by examiner

US 9,868,214 B2

LOCALIZATION OF A MOBILE SYSTEM

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

SUMMARY

In one aspect, a method is provided. A control system receives a request for a particular mobile robotic device to travel between a first area and a cell area of an environment. The first area is connected to the cell area. The control system is configured with one or more identification sensors. After receiving the request for the particular mobile robotic device to leave the first area, the control system disables a first-area presence sensor configured to detect the presence of objects traveling between the first area and the cell area. The control system receives information indicating that a mobile robotic device has moved into the cell area. The mobile robotic device includes one or more identifiers. The information indicating that the mobile robotic device is in the cell is obtained from the one or more identifiers using the one or more identification sensors. The control system verifies that the information indicating that the mobile robotic device is in the cell area indicates that the particular mobile robotic device is in the cell area. After verifying that the particular mobile robotic device is in the cell area, the control system: disables the particular mobile robotic device, enables the first-area presence sensor detecting the presence of objects traveling between the first area and the cell area, and after disabling the particular mobile robotic device, provides an indication that the particular mobile robotic device is disabled in the cell area.

In another aspect, a control system is provided. The control system includes one or more identification sensors and a computing device. The computing device includes one or more processors and data storage. The data storage includes at least computer-executable instructions stored thereon that, when executed by the one or more processors, cause the control system to perform functions. The functions include: receiving a request for a particular mobile robotic device to travel between a first area and a cell area of an environment, where the first area is connected to the cell area; after receiving the request for the particular mobile robotic device to leave the first area, disabling a first-area presence sensor configured to detect the presence of objects traveling between the first area and the cell area; receiving information indicating that a mobile robotic device has moved into the cell area, where the mobile robotic device includes one or more identifiers, and where the information indicating that the mobile robotic device is in the cell is obtained from the one or more identifiers using the one or more identification sensors; verifying that the information indicating that the mobile robotic device is in the cell area indicates that the particular mobile robotic device is in the cell area; and after verifying that the particular mobile robotic device is in the cell area: disabling the particular mobile robotic device, enabling the first-area presence sensor detecting the presence of objects traveling between the first area and the cell area, and after disabling the particular mobile robotic device, providing an indication that the particular mobile robotic device is disabled in the cell area.

In another aspect, a non-transitory computer readable medium is provided. The non-transitory computer readable medium has stored thereon instructions, that when executed by one or more processors of a computing device, cause the computing device to perform functions. The functions include: receiving a request for a particular mobile robotic device to travel between a first area and a cell area of an environment, where the first area is connected to the cell area, and where the computing device is associated with one or more identification sensors. after receiving the request for the particular mobile robotic device to leave the first area, disabling a first-area presence sensor configured to detect the presence of objects traveling between the first area and the cell area; receiving information indicating that a mobile robotic device has moved into the cell area, where the mobile robotic device includes one or more identifiers, and where the information indicating that the mobile robotic device is in the cell is obtained from the one or more identifiers using the one or more identification sensors; verifying that the information indicating that the mobile robotic device is in the cell area indicates that the particular mobile robotic device is in the cell area; and after verifying that the particular mobile robotic device is in the cell area: disabling the particular mobile robotic device, enabling the first-area presence sensor detecting the presence of objects traveling between the first area and the cell area, and after disabling the particular mobile robotic device, providing an indication that the particular mobile robotic device is disabled in the cell area.

In another aspect, an apparatus is provided. The apparatus includes: means for receiving a request for a particular mobile robotic device to travel between a first area and a cell area of an environment, where the first area is connected to the cell area, and where the apparatus is configured with identification means; means for, after receiving the request for the particular mobile robotic device to leave the first area, disabling a first-area presence sensor configured to detect the presence of objects traveling between the first area and the cell area; means for receiving information indicating that a mobile robotic device has moved into the cell area, where the mobile robotic device includes one or more identifiers, and where the information indicating that the mobile robotic device is in the cell is obtained from the one or more identifiers using the identification means; means for verifying that the information indicating that the mobile robotic device is in the cell area indicates that the particular mobile robotic device is in the cell area; and means for, after verifying that the particular mobile robotic device is in the cell area: disabling the particular mobile robotic device, enabling the first-area presence sensor detecting the presence of objects traveling between the first area and the cell area, and after disabling the particular mobile robotic device, providing an indication that the particular mobile robotic device is disabled in the cell area.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Overview

Figure 1A:
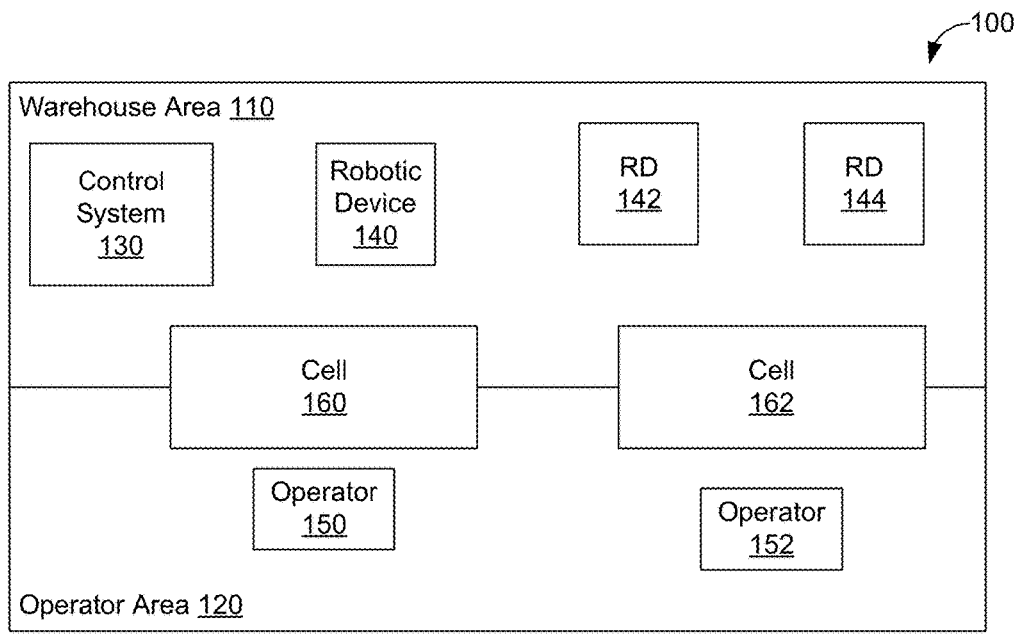
FIG. 1A shows an environment divided into two areas, in accordance with an example embodiment.

When robots and humans work side-by-side, the robots may be certified for safe use in a mixed human/robotic environment. An example control system, such as a safety system, can be used in environments where operators, including human operators, and robotic devices (RDs) work side-by-side can involve use of identifiers on a mobile robotic device. The control system can receive sensor data from one or more identification sensors that can be located in an area where humans and robots are in close proximity. The identification sensors can obtain information from the identifiers for the control system. The control system can use the information to verify the identity of a particular robotic device, and, upon verification, lock out the robotic device from external interaction.

In some examples, robotic devices in the environment can be controlled by a central command system that can include a globally-oriented control system. In these examples, locking out robotic device from external interaction can include a command from the central command system and/or the globally-oriented control system disabling the robotic device; that is, instructing the robotic device not to move and perhaps shut down. However, if the central command system and/or the globally-oriented control system had a fault, was inoperative, or otherwise failed, the command disabling the robotic device may not get sent or may get sent to an incorrect robotic device, thereby placing an operator at risk of injury from the still-enabled robotic device.

The use of one or more locally-oriented control systems that is/are separate from the central command system and the globally-oriented control system can provide a secure environment even in case of such failures. Suppose robotic device R is destined to work near to operator O. A locally-oriented control system can include instructions to determine the identify of robotic device R using sensor data from one or more identification sensors, verify R's identity using the sensor data, and send a command to disable robotic device R before O comes near to R. In some embodiments, the locally-oriented control system can be separate from the central command system and the globally-oriented control system. In particular of these embodiments, the instructions of the locally-oriented control system can be hardcoded and/or implemented in hardware. Then, as long as the locally-oriented control system can obtain data from the identification sensors and communicate with robotic devices, the locally-oriented control system can reliably disable robotic devices identified as working near operators.

By properly locking out the mobile robotic system in areas of operation close to humans based on information provided by the identification sensors, the control system and the mobile robotic device can be compliant with rigorous safety standards and ensure operator safety while working in close proximity with robotic devices. Further, software and/or hardware faults in the central command system and the globally-oriented control system likely will not cause safety concerns related to robotic devices remaining enabled while near operators.

The areas where operators and robots are in close proximity can include cells that are protected from unauthorized/unexpected entry by presence sensors (PSs), such as motion detectors, light curtains, proximity sensors, and/or cameras. The cells can be located at boundaries between robot-only areas of an environment, and operator-only areas of the environment. After a cell is selected, the mobile robotic device can send a request for entry into the cell to a control system. The control system can disable a warehouse presence sensor protecting the robot-only side of the cell, and the mobile robotic device can enter into the cell.

Upon entry into the cell, the control system can detect the mobile robotic device using identification sensors in the cell obtaining information from the mobile robotic device. The identifiers mentioned as being on the mobile robotic device and the identification sensors in the cell can use one or more sensing technologies. For example, the identifiers and identification sensors can be or include Radio Frequency Identification (RFID) chips and related readers, proximity sensors, barcodes and related readers, laser trackers, location sensors, and/or other related sensors.

The information can include information identifying the mobile robotic device, information locating the mobile robotic device, and other information. For example, an RFID reader RR with a relatively short range (e.g., 10 meters) can be used as an identification sensor to read information from a particular robotic device and provide the information to the control system. By determining that RR provided the information read from the particular robotic device and recognizing that RR is a relatively-short range device, the control system can locate the particular robotic device as being within the range of RFID reader RR, and the information read by RFID reader RR can contain information identifying the mobile robotic device and/or other information.

The use of an environment with cells, which can be well-defined regions where robotic devices are disabled before (human) operators enter and where the robotic devices are only enabled after the operators exit, can enable certifiably safe human-robotic interactions. Once in the cell, the operators can safely work with a now-disabled robotic device, such as but not limited to, retrieving objects brought into the cell by the now-disabled robotic device, place objects onto the now-disabled robotic device, and operate on (e.g., repair, inspect, examine) the now-disabled robotic device. The cells further permit the environment to be separated into distinct areas or zones, where robotic devices operate freely in a "robot only" area or zone and (human) operators work in an "operator only" area or zone—in this separated environment, the cells can be designated regions where the robotic devices and (human) operators can interact safely. In such a separated environment, cells can be protected from unauthorized entry by presence sensors that, when activated, cause partial or complete shutdown of robotic devices in the separated environment. Thus, the use of cells in an environment where (human) operators and robotic devices work in separate areas or zones can enable certifiably safe (human) operator/robotic device interactions in the separated environment, thus enabling efficient and safe employment of both (human) operators and robotic devices.

Control Systems for Localizing Robotic Devices

FIG. 1A shows environment 100 divided into two areas, warehouse area 110 and operator area 120, in accordance with an example embodiment. In environment 100, robotic devices 140, 142, 144 stay within warehouse area 110, operators 150, 152 stay within operator area 120, and cells 160, 162 are used for operator/robotic device interaction. Operators 150, 152 can be one or more humans, robots, and/or combinations of human(s) and robot(s); e.g., an operator can be one or more persons riding and/or otherwise using one or more robotic devices.

In some examples, robotic devices 140, 142, 144 are mobile robotic devices equipped to carry objects stored in various locations warehouse area 110 for operator selection. The operators can then retrieve the selected objects for other uses; e.g., ready the objects for shipment, perform tasks using the selected items, provide the selected items to customers for purchase, etc. In some of these examples, operators can also, or instead, place objects onto a mobile robotic device (e.g., for storage in warehouse area 110) and/or operate on (e.g., repair, inspect, examine) the mobile robotic device. Other interactions between operators and (mobile) robotic devices are possible as well.

Environment 100 can be monitored by control system 130, which can act as part or all of a safety system, to better protect the environment. Control system 130 can be used to instruct robotic entities, such as robotic devices 140, 142, 144, in accordance with one or more safety policies. An example safety policy is that a robotic entity is to be disabled when in close proximity to an operator, such as operators 150, 152, to avoid collisions between robotic entities and operators. Other safety policies are possible as well.

Control system 130 can include one or more globally-oriented control systems and one or more locally-oriented control systems. The one or more globally-oriented control systems, such as warehouse control system(s), can enforce policies, such as safety policies, throughout environment 100. The one or more locally-oriented control systems can enforce safety policies throughout one or more local regions of environment 100. For example, a warehouse control system can monitor robotic entities and operators throughout environment 100, while a locally-oriented control system can monitor robotic entities and operators in (and around) one or more cells, such as cell 160 and/or cell 162. Other globally-oriented control systems and/or locally-oriented control systems are possible as well.

In some embodiments, a warehouse control system can communicate with a cell-oriented control system to enforce safety policies. The warehouse control system can send messages to cell-oriented control system at least to: request that a cell monitored by the cell-oriented control system be reserved, inform the cell-oriented control system that a robotic entity is ready to and/or has actually entered or exited the cell, inform the cell-oriented control system that an operator is ready to and/or has actually entered or exited the cell, inform the cell-oriented control system that materiel is available for interaction within the cell, to indicate to the cell-oriented control system that the cell is no longer reserved, and to request status about part or all of the cell (e.g., a status of a presence sensor, an identity of a robotic entity and/or an operator in or near the cell, any movements observed by the cell-oriented control system within the cell, etc.) from the cell-oriented control system. Then, the cell-oriented control system can send responses to these messages back to the warehouse control system; e.g., responses acknowledging of reservation and/or information messages, providing requested status information about presence sensors, etc.

Also, the cell-oriented control system can send messages to the warehouse control system at least to: to inform the warehouse control system of an emergency status in the cell, to query the emergency and/or other statuses of the cell or other regions of environment 100, and/or to request a reset of the cell. An emergency status in a cell can be indicated if an activated presence sensor detects an object, if the cell-oriented control system detects that a robotic entity has been activated while one or more operators are also present in the cell, if the cell-oriented control system detects a fault or inconsistency, or under other conditions where operator safety could be at risk.

The cell can be reset by ensuring that the cell is empty and then activating all presence sensors and identification sensors for the cell. The cell can be emptied by ensuring the cell is empty of operators, then ensuring the cell is empty of robotic entities, and then verifying the cell is empty. To ensure the cell is empty of operators, warehouse presence sensor 176 can be temporarily disabled, any operators can be instructed to leave the cell for operator area 120, and once the robotic entities have left the cell, warehouse presence sensor 176 can be enabled. Similarly, to ensure the cell is empty of robotic entities, warehouse presence sensor 170 can be temporarily disabled, any robotic entities in the cell can be activated and instructed to leave the cell for warehouse area 110, and once the robotic entities have left the cell, warehouse presence sensor 170 can be enabled. The cell can verified as empty using cameras, identification sensors, and/or other sensors with the cell. Then, the warehouse control system can send responses to these messages back to the cell-oriented control system; e.g., responses granting reset requests, acknowledging emergency status messages, providing information in response to queries, etc.

Figure 1B:
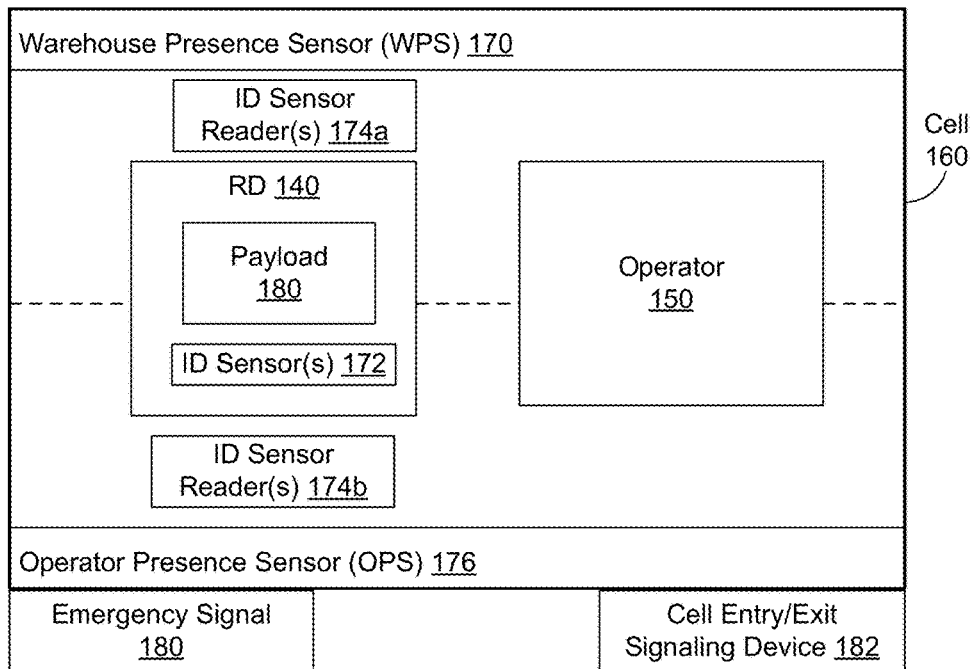
FIG. 1B shows a block diagram of a cell, in accordance with an example embodiment.

FIG. 1B shows a block diagram of cell 160, in accordance with an example embodiment. Cell 160 includes portions of both warehouse area 110 and operator area 120, where the boundary between areas 110 and 120 is shown using a dashed line, and the boundary of cell 160 is shown using a relatively thick line. Cell 160 includes warehouse presence sensor (WPS) 170 in the warehouse-area portion of cell 160 and operator presence sensor (OPS) 176 in the operator-area portion of cell 160. In some embodiments, warehouse presence sensor 170 and/or operator presence sensor 176 can be outside yet adjacent to cell 160, that is, warehouse presence sensor 170 and/or operator presence sensor 176 the respective warehouse-area and operator-area portions adjacent to cell 160.

When enabled, a presence sensor (PS), such as warehouse presence sensor 170 and operator presence sensor 176, can provide an indication that an object is present within a sensing field of the presence sensor. The indication can be provided to control system 130, which can determine that since the presence sensor has sensed an (unexpected) object, an emergency condition may exist. After determining that the emergency condition does exist, control system 130 can send commands to disable robotic devices 140, 142, 144 to prevent (further) accidents and can send a command to activate emergency signal 180 to inform operators in operator area 120 about the emergency condition. The emergency condition can then be investigated—once the emergency has passed, control system 130 can send commands to enable robotic devices 140, 142, 144 and send a command to deactivate emergency signal 180.

FIG. 1B also shows that cell 160 includes identification (ID) sensors 174a, 174b that can be used to read one or more identifiers 172 present on robotic device 140 and/or other robotic device(s) present in cell 160. Identification sensor(s) 174a, 174b can be placed in the warehouse-area and/or the operator-area portion of cell 160 and can be used to identify a robotic device and determine the robotic device's relative location in cell 160. For example, suppose robotic device 140 is configured as a robotic forklift, with a body and two tines extending forward from the body. Then, identifier(s) 172 can be placed on robotic device 140 to identify the robotic device as a particular robotic device; e.g., robotic device 140, where each identifier can store, encode, and/or include identification data identifying the robotic device as robotic device 140 and/or a location on the device where the sensor is stored; e.g., store data indicating a sensor is located on robotic device 140, a sensor is located on a left-side tine of a robotic device, or a sensor is located on left-side tine of robotic device 140.

Then, identification sensor(s) 174a, 174b can obtain data from the identifiers on various locations of the robotic device and determine whether the robotic device is oriented within cell 160. Continuing the forklift example, robotic device 140 can have two identifier(s) 172—one located on each tine of the device, and identification sensor(s) 174a, 174b can be placed within cell 160 so that sensor(s) 174a, 174b can read or otherwise obtain information from identifier(s) 172 when robotic device 140 is completely inside cell 160. Control system 130 can verify that the information obtained from identifier(s) 172 identifies a robotic device that is designated to use cell 160; e.g., control system 130 can receive an indication that robotic device 140 is to use cell 160, and then verify that the information obtained from identifier(s) 172 specifically identifies robotic device 140, as opposed to some other robotic device.

For example, suppose that robotic devices are identified using ID numbers. Then, verifying that the information obtained from identifier(s) 172 specifically identifies robotic device 140 can include determining that an ID number of the information obtained from identifier(s) 172 matches an ID number of the robotic device that is designated to use cell 160. In other examples, other types of identification than ID numbers can be used; e.g., ID strings, keys, serial number, etc.

Once sensor(s) 174a, 174b and control system 130 have obtained and verified data from identifier(s) 172 indicating robotic device 140 is completely inside cell 160, control system 130 can send a command to disable robotic device 140 and so keep the device from moving. In some embodiments, once control system 130 has sent a command to disable robotic device 140, robotic device 140 can only be enabled by control system 130, thus reducing or eliminating occurrence of accidental/unintentional activation while robotic device 140 is in a cell, such as cell 160.

After robotic device 140 is disabled, control system 130 can send a command to disable operator presence sensor 176, allowing entry of operator 150 into cell 160. In some embodiments, control system 130 can also send a command instructing cell entry/exit signaling device 152 to provide a signal informing operators in operator area 120 that (a) entry into cell 160 is permitted and/or (b) a robotic device, perhaps specifically indicating robotic device 140 is awaiting interaction within cell 160. Then, operator 150 can enter cell 150, obtain part or all of payload 180 from robotic device 140, and leave cell 160 with part or all of payload 180. Upon exit from cell 160, operator 150 can use cell entry/exit signaling device 152 to provide an indication informing control system 130 that interaction with robotic device is complete. For example, cell entry/exit signaling device 152 can have an "exit cell" button that, when depressed by operator 150, causes cell entry/exit signaling device 152 to provide the indication.

After receiving the indication that the interaction with robotic device is complete, control system 130 can send commands to enable operator presence sensor 176, disable warehouse presence sensor 170, and enable robotic device 140. Once enabled, robotic device 140 can exit cell 140, and, upon exit of robotic device 140, control system 130 can send a command to warehouse presence sensor 170 to restore cell 160 to a ready for interaction state.

Figure 1C:
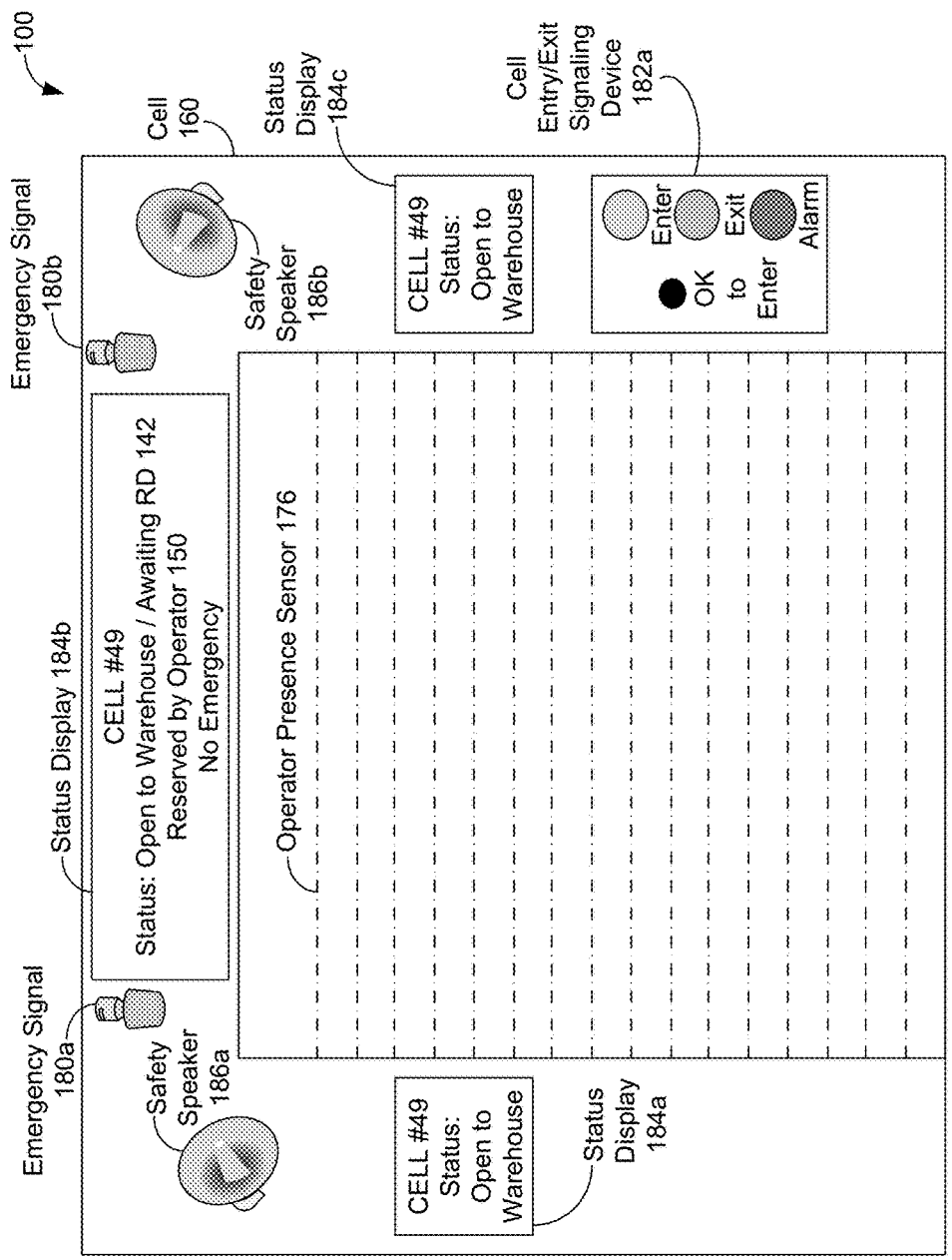
FIG. 1C shows an operator-side view of the cell of FIG. 1B, in accordance with an example embodiment.

FIG. 1C shows an operator-side view of cell 160, in accordance with an example embodiment. The operator-side view of cell 160 includes operator presence sensor 176, emergency signals 180a, 180b, cell entry/exit signaling device 182a, status displays 184a, 184b, 184c, and safety speakers 186a, 186b. FIG. 1C shows operator presence sensor 176 as a series of dotted-and-dashed lines. In some embodiments, operator presence sensor 176 is not visible when activated or when deactivated, while in other embodiments, operator presence sensor 176 can be visible while activated and not visible while deactivated.

Emergency signals 180a, 180b can provide a visual indication of an emergency condition in environment 100 generally and/or in a region of environment 100 including cell 160 more specifically. For example, the visual indication can be one or more constantly-lit lights, flashing lights, rotating lights and/or other visible displays. FIG. 1C shows alarm lights used as emergency signals 180a, 180b; in other examples, other types of visual indicators, such as displays (e.g., displays 184a, 184b, 184c) and other types of lights/lamps, can be used to provide visual indications of emergency conditions. In still other examples, more or fewer emergency signals can be used than shown in FIG. 1C.

Cell entry/exit signaling device 182a can be used by an operator (or other entity) to indicate one of three conditions to control system 160: when the "Enter" button is pressed, cell entry/exit signaling device 182a can indicate to control system 130 that the operator is about to enter cell 160, when the "Enter" button is pressed, cell entry/exit signaling device 182a can indicate to control system 130 that the operator has just left cell 160, and when the "Alarm" button is pressed, cell entry/exit signaling device 182a can indicate to control system 130 that an emergency condition has been observed by the operator. Cell entry/exit signaling device 182a can be used by control system 130 to indicate that cell 160 is ready for operator entry by illuminating an "OK to Enter" light. In the example shown in FIG. 1C, the "OK to Enter" light of cell entry/exit signaling device 182a is shown as not being illuminated, thereby indicating that cell 160 is not ready for operator entry; i.e., operator presence sensor 176 is active. In other examples, other devices than shown in FIG. 1C can be used to perform the functionality of cell entry/exit signaling device 182; e.g., touch screens, displays, keypads, etc.

Status displays 184a, 184b, 184c can be used to provide visual and perhaps audible indications of information, such as status information, about at least cell 160. As shown in FIG. 1C, status display 184a can provide information about at least cell 160 including a cell identifier :"CELL #49", a status of cell 160 "Open to Warehouse/Awaiting RD" (robotic device) "142" and "Reserved by Operator 150" indicating that cell 160's warehouse-side presence sensor is open (deactivated), identifying an operator "Operator 150" as reserving the cell and indicating a robotic device "RD 142" that is to use the cell for interaction. Status displays 184b and 184c provide an abbreviated version of the information provided by status display 184a; FIG. 1C shows that both status displays 184b and 184c indicate the cell identifier "CELL #49" and a status of "Open to Warehouse". A status display can also provide other information, such as the emergency information of "No Emergency" provided by status display 184a. More, less, and or different information can be provided by status displays 184a, 184b, and/or 184c. In other examples than shown in FIG. 1C, more, fewer, and/or different status displays can be used on an operator-side of cell 160.

Safety speakers 186a, 186b can provide an audible indication of an emergency condition in environment 100 generally and/or in a region of environment 100 including cell 160 more specifically. For example, the audible indication can be one or alarm bells, sirens, tones, and/or other sounds. FIG. 1C shows loud speakers used as safety speakers 186a, 186b that are distinct from other devices; in other examples, emergency signals 180a, 180b and/or safety speakers 186a, 186b can be integrated into other devices (e.g., one or more displays 184a, 184b, 184c). In still other examples, more or fewer safety speakers can be used than shown in FIG. 1C.

Figure 1D:
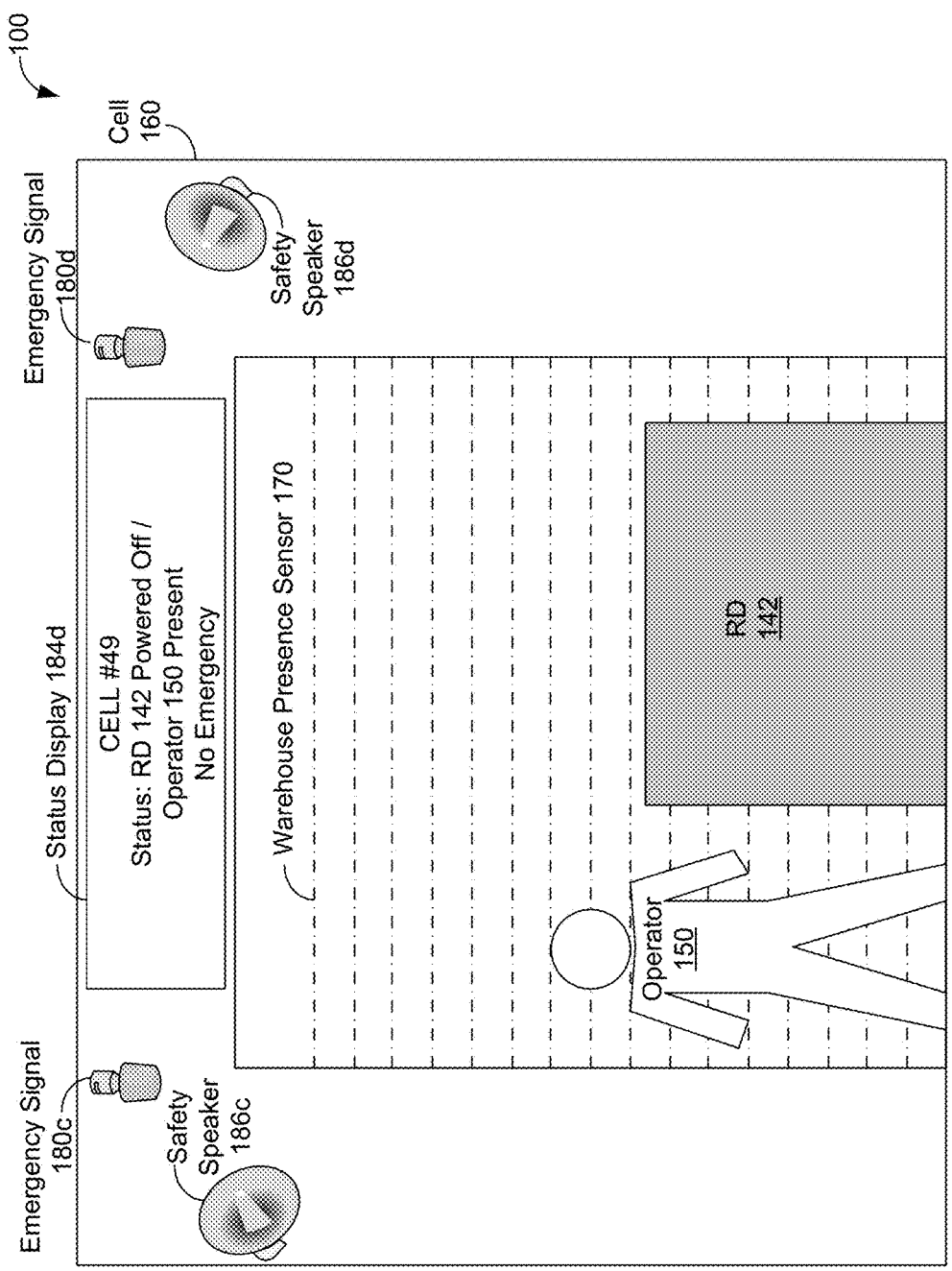
FIG. 1D shows a warehouse-side view of the cell of FIG. 1B, in accordance with an example embodiment.

FIG. 1D shows a warehouse-side view of cell 160, in accordance with an example embodiment. The warehouse-side view of cell 160 includes warehouse presence sensor 170 and status display 188. FIG. 1D shows warehouse presence sensor 170 as a series of dotted-and-dashed lines. In some embodiments, warehouse presence sensor 170 is not visible when activated or when deactivated, while in other embodiments, warehouse presence sensor 170 can be visible while activated and not visible while deactivated.

In environment 100, warehouse area 110 is intended to be primarily utilized by robotic devices, and exclusively utilized by robotic devices for the majority of the time. However, (human) operators, technicians, and other personnel may have to utilize warehouse area 110. For their convenience and safety, emergency signals 180c, 180d, status display 184d, safety speakers 186d are provided on the warehouse-side of cell 160. Emergency signals 180c, 180d can perform the same functionality as described with respect to emergency signals 180a, 180b of FIG. 1C, status display 184d can perform the same functionality as described with respect to status display 184a, 184b, 184c of FIG. 1C, and safety speakers 186c, 186d can perform the same functionality as described with respect to safety speakers 186a, 186b of FIG. 1C.

Status display 184d indicates that the status of "CELL #49" includes robotic device "142" being "Powered Off", that "Operator 150" is "Present", and "No Emergency" condition exists. In accord with this status. FIG. 1D shows operator 150 and robotic device 142 present in cell 160.

Figure 1E:
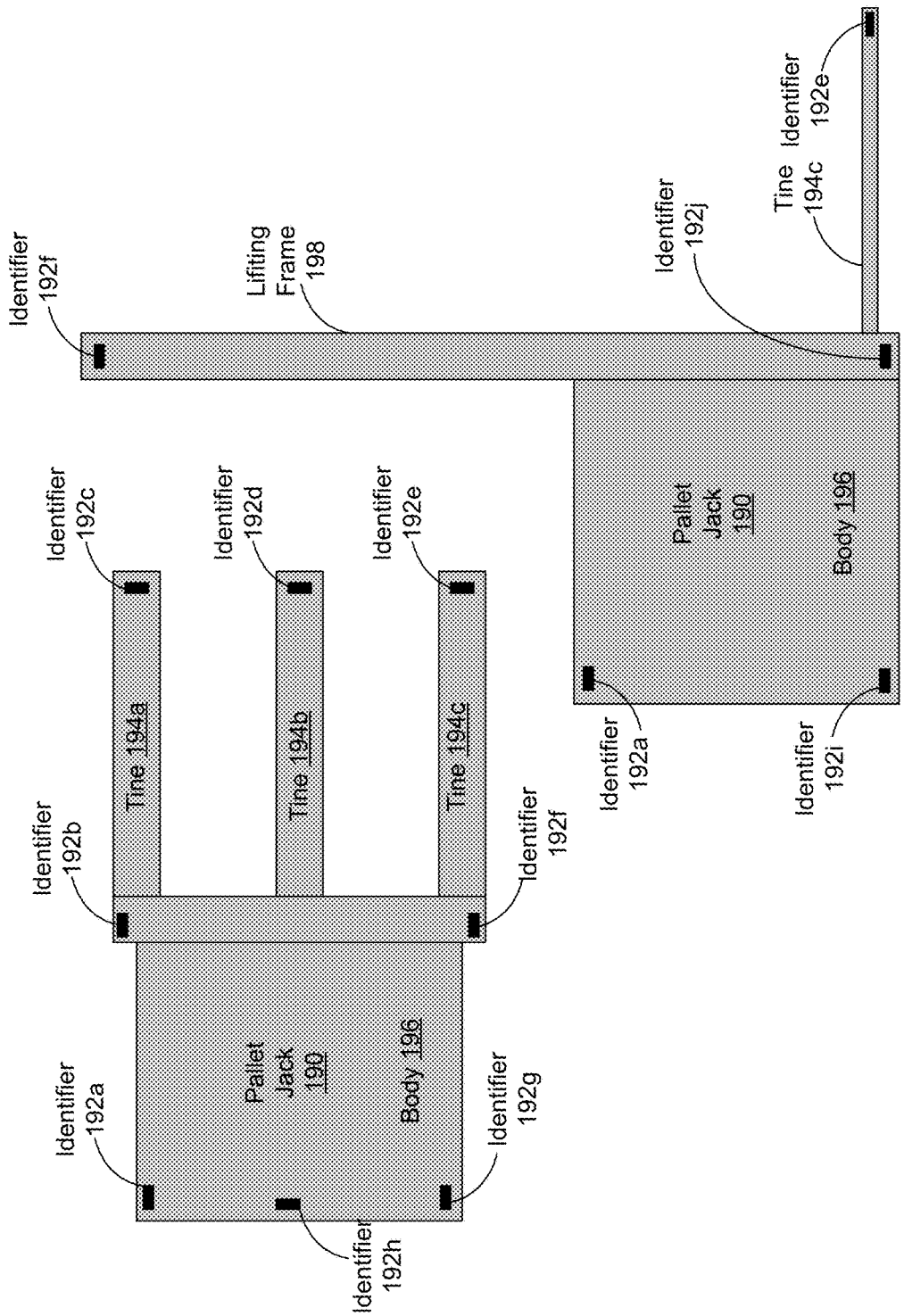
FIG. 1E shows overhead and left-side views of a pallet jack, in accordance with an example embodiment.

FIG. 1E shows overhead and left-side views of pallet jack 190, in accordance with an example embodiment. One or more of robotic devices 140, 142, and 144 can be embodied as a pallet jack, such as pallet jack 190. Pallet jack 190 can be used to lift and move one or more pallets or other objects within environment 100. The pallet(s) and/or other object(s) can be placed on tines 194a, 194b, 194c and moved by pallet jack 190.

On the left side of FIG. 1E, the overhead view shows pallet jack 190 with tines 194a, 194b, 194c and identifiers 192a, 192b, 192c, 192d, 192e, 192f, 192g, 192h. On the right side of FIG. 1E, the left-side view shows pallet jack 190 with identifiers 192a, 192e, 192f, 192g, 192i, 192j. Identifiers 192a, 192b, 192c, 192d, 192e, 192f, 192g, 192h, 192i, 192j are shown on various locations of pallet jack 190—identifiers 192a, 192g, 192h, and 192i are shown on body 196 of pallet jack 190; identifiers 192b, 192f, and 196j are shown on lifting frame 198, and identifiers 192c, 192d, and 192e are shown on respective tines 194a, 194b, and 194c of pallet jack 190. Identifiers 192a-192j can have information that identifies a robotic device; e.g., an identity (ID) number, an ID string, a key value associated with the robotic device, etc. in some embodiments, identifiers 192a-192j can have information that identifies the robotic device and locates the identifier on the robotic device—e.g., on pallet jack 190, on body 196 of pallet jack 190, at upper left of body 196 of pallet jack 190, at the end of tine 194a of pallet jack 190, at the top of lifting frame 198 of pallet jack 190, etc. In other embodiments, more, less, and/or different information can be provided by one or more of identifiers 192a-192j.

The information of identifiers 192a-192j can be obtained using one or more identification sensors configured to detect and/or read one or more of identifiers 192a-192j. The identification sensors can obtain the information of identifiers 192a-192j to identify a robotic device. For example, if each of identifiers 192a-192j encodes information including an ID number "142" associated with robotic device 142, then an identification sensor can read an identifier of identifiers 192a-192j to obtain the ID number "142", and identify pallet jack 190 as robotic device 142.

Identification sensors can also determine an orientation of pallet jack 190 based on information obtained from one or more of identifiers 192a-192j. For example, if the identification sensors are located at fixed locations; e.g., at predetermined locations within cell 160, then the orientation of pallet jack 190 can be determined from the information obtained from one or more of identifiers 192a-192j. Since the identification sensors are at fixed locations, then when a particular identifier of identifiers 192a-192j is read, then the location of the identifier on pallet jack 190 can be associated with the fixed location of the identification sensor, particularly if identification sensors have relatively-short ranges. For example, if an identification sensor LEFT_LOW on the left side and near the floor of cell 190 reads identifier 192c at time T1, then the location of end of tine 194a can be determined to be within the range of LEFT_LOW on the left side and near the floor of cell 190. Continuing this example, if an identification sensor RIGHT_LOW on the right side and near the floor of cell 190 reads identifier 192e at time T1, then the location of end of tine 194c can be determined to be within the range of RIGHT_LOW on the right side and near the floor of cell 160. Then, the orientation of at least tines 194a and 194c of pallet jack 190 with respect to cell 160 at time T1 can be determined based on the locations and ranges of identification sensors LEFT_LOW and RIGHT_LOW.

Identifiers 192a-192j and identification sensors can be or include Radio Frequency Identification (RFID) chips and related readers, proximity sensors, barcodes and related readers, laser trackers, location sensors, and/or other related sensors. In other examples, pallet jack 190 can be configured with more or fewer tines, with a handle, without lifting frame 198, with a differently shaped body, tines, and/or lifting frame, and with more, fewer, and/or different identifiers.

Figure 2A:
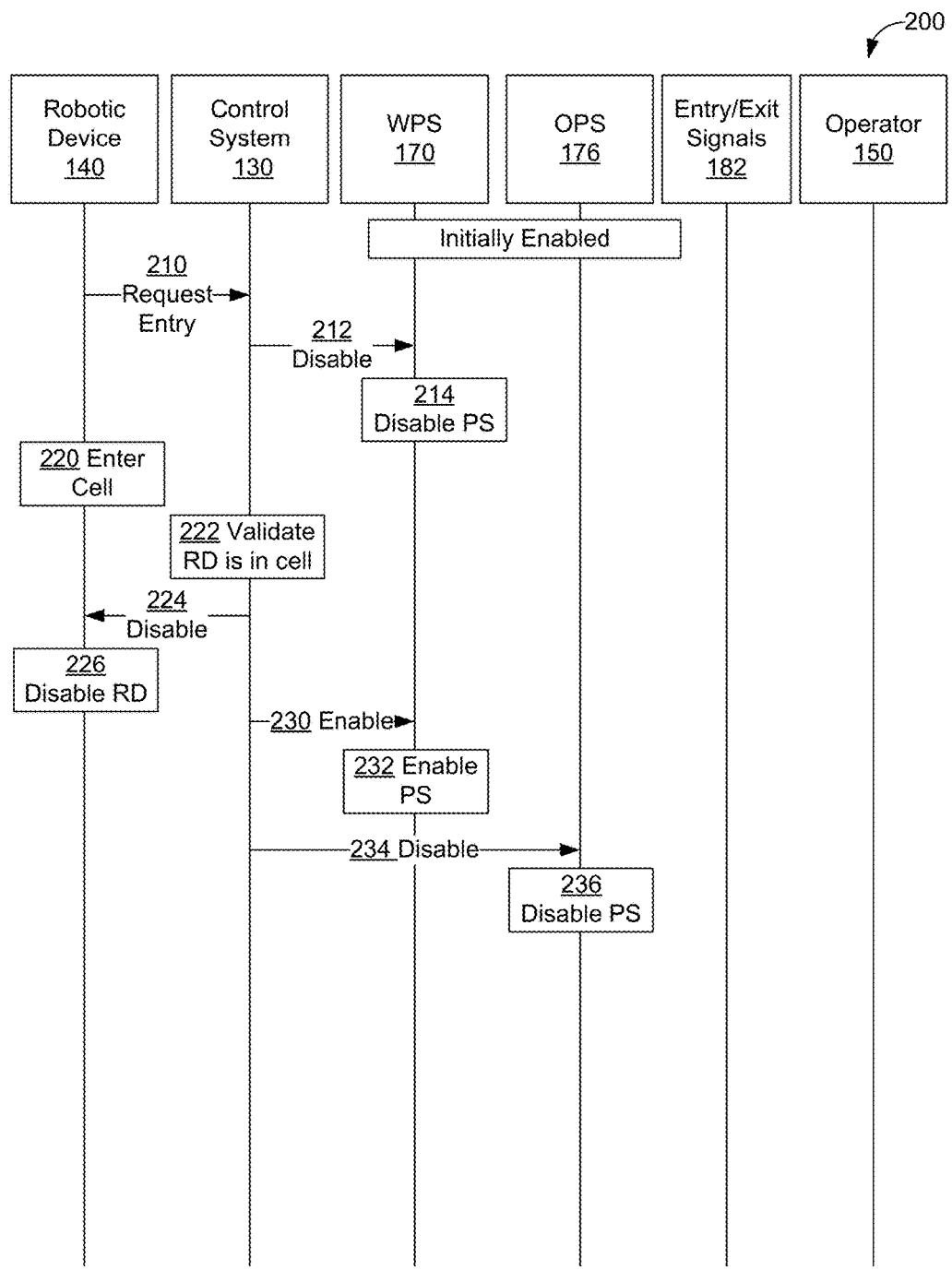
FIGS. 2A and 2B illustrate a scenario where a robotic device and an operator interact in a cell 160, in accordance with an example embodiment.
Figure 2B:
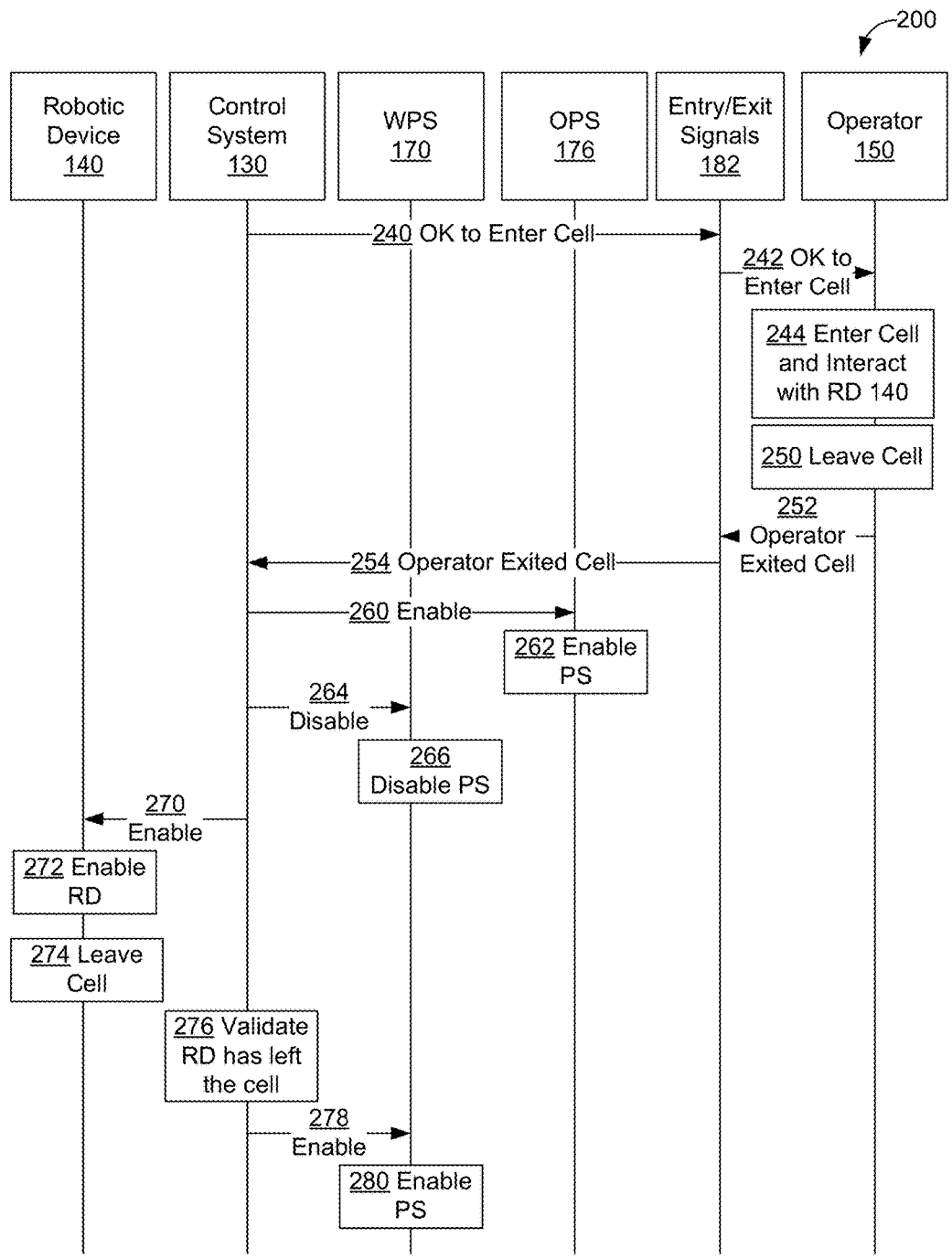

FIGS. 2A and 2B illustrate a scenario 200 where robotic device 140 and operator 150 interact in cell 160 of FIGS. 1A-1D, in accordance with an example embodiment. Scenario 200 begins with environment 100 in a non-emergency state and cell 160 in an empty or ready for interaction state—that is, cell 160 is empty of robotic devices and operators, and both warehouse presence sensor 170 and operator presence sensor 176 are activated. Scenario 200 continues with robotic device 140 sending request entry message 210 to control system 130 for requesting entry into cell 160. In response to message 210, control system 130 can put cell 160 into a ready-for-robotic-device entry state by sending disable message 212 to warehouse presence sensor 170. Then, warehouse presence sensor 170 can act upon disable message 212 by performing the procedures of block 214 to disable the warehouse presence sensor 170. For example, a presence sensor can disable itself by shutting itself down, putting itself into an idle state, and/or by inhibiting sending information about objects detected within its sensing field. Further, a presence sensor can enable itself by powering itself up, removing itself from the idle state, and/or by enabling sending information about objects detected within its sensing field. Other techniques for disabling and/or enabling presence sensors are possible as well. In some embodiments, after sending disable message 212, control system 130 can inform robotic device 140 that cell 160 is ready for robotic device entry.

Scenario 200 continues with robotic device 140 performing the procedures of block 220 to enter cell 160. Upon entry of robotic device 140 into cell 160, identification sensor(s) 174a, 174b can send control system 130 information obtained from identifiers aboard robotic device 140 indicating that robotic device is completely within cell 160. Control system 130 can perform the procedures of block 222 to validate the information provided by identification sensor(s) 174a, 174b within cell 160 to verify both that the robotic device within cell 160 is robotic device 140 (that is, the robotic device identified in request entry message 210) and that robotic device 140 is completely within cell 160. Upon validation that robotic device 140 is completely within cell 160, control system 130 can send disable message 224 instructing robotic device 140 to disable itself.

Upon reception of message 224, robotic device 140 can use the procedures of block 226 to disable itself—for example, robotic device 140 can shut itself down, disable its movement, and/or put itself into an idle state. Additionally, a robotic device, such as robotic device 140, can enable itself by powering itself up, enabling its movement, and/or removing itself from the idle state. Other techniques for disabling and/or enabling robotic devices are possible as well. Upon validation that robotic device 140 is completely within cell 160, control system 130 can also send enable message 230 to enable warehouse presence sensor 170, and warehouse presence sensor 170 can perform the procedures of block 232 to enable itself. Further, control system 130 can also send disable message 234 to disable operator presence sensor 176, and operator presence sensor 176 can perform the procedures of block 236 to disable itself. Once operator presence sensor 176 is disabled, cell 160 is ready for operator entry and interaction with robotic device 140.

FIG. 2B shows that scenario 200 continues with control system 130 sending OK to enter cell message 240 to entry/exit signals device 182. After receiving message 240, entry/exit signals device 182 can indicate that cell 160 is ready for operator entry and send OK to enter cell message 240 to operator 150. In some scenarios, control system 130 sends OK to enter cell message 240 directly to operator 150, while in other scenarios, entry/exit signals device 182 does not send OK to enter cell message 242. Scenario 200 continues with operator 240 carrying out the procedures of blocks 244 and 250 to respectively enter cell 160 and interact with robotic device 140 within cell 160, and leave cell 160. After leaving cell 160, operator 150 can provide exited cell message 252 to cell entry/exit signals device 182, which can in turn send exited cell message 254 to control system 130. In other scenarios, after operator 150 has left cell 160, operator 150 can send message 252 by interacting with entry/exit signals device 182; e.g., by pressing a leave cell or exit button, and thus direct entry/exit signals device 182 to send exited cell message 254 to control system 130.

After receiving exited cell message 254, control system 130 can send enable message 260 to operator presence sensor 176, and operator presence sensor 176 can perform the procedures of block 262 to enable itself. Additionally, after receiving exited cell message 254, control system 130 can send disable message 264 to warehouse presence sensor 170, and warehouse presence sensor 170 can perform the procedures of block 266 to disable itself, thus making cell 160 ready for robotic system 140 for exit.

After warehouse presence sensor 170 is disabled, control system 130 can send enable message 270 to robotic device 140, and robotic device 140 can perform the procedures of block 272 to enable itself and perform the procedures of block 274 to exit cell 160.

Upon exit of robotic device 140 from cell 160, identification sensor(s) 174a, 174b can send control system 130 information obtained from identifiers aboard robotic device 140 indicating that robotic device is completely outside cell 160. Control system 130 can perform the procedures of block 276 to validate the information provided by identification sensor(s) 174a, 174b within cell 160 that robotic device 140 is completely outside cell 160. Upon validation that robotic device 140 is completely out cell 160, control system 130 can send enable message 278 to warehouse presence sensor 170, and warehouse presence sensor 170 can perform the procedures of block 280 to enable itself, and so cell 160 can be restored to the empty or ready for interaction state, and scenario 200 can be completed.

Figure 3:
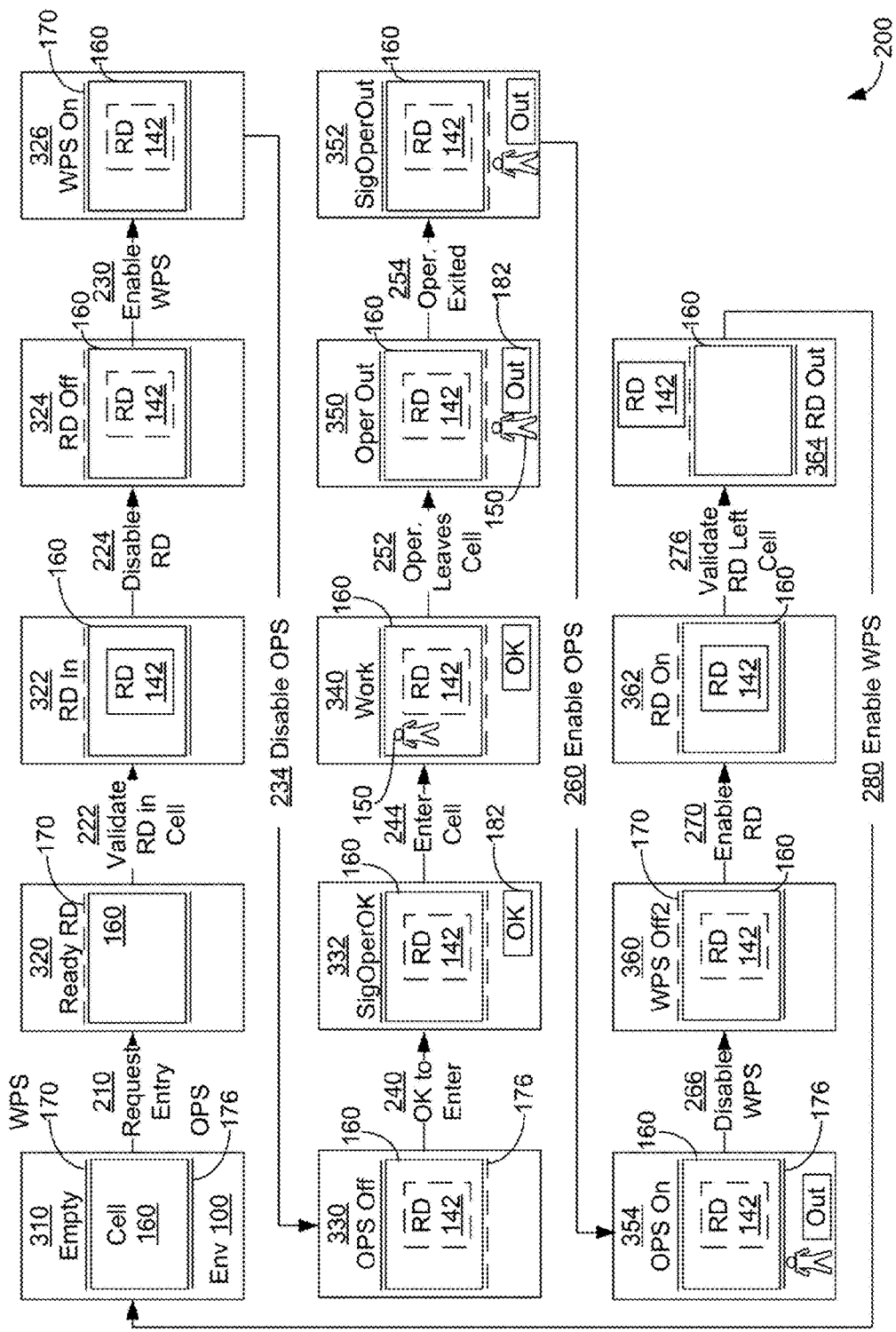
FIG. 3 shows illustrates states of a cell during the scenario of FIGS. 2A and 2B, in accordance with an example embodiment.

FIG. 3 shows illustrates states of cell 160 during scenario 200, in accordance with an example embodiment. Scenario 200 can also be considered from the point of view of cell 160. For example, cell 160 can be thought of as starting in an empty or ready for interaction state, then traversing through a series of states before returning to the empty or ready for interaction state.

As shown at upper left, FIG. 3 shows cell 160 in empty (or ready for interaction) state 310 with warehouse presence sensor (WPS) 170 active as indicated using a solid line, operator presence sensor (OPS) 176 active as also indicated using a solid line, and cell 160 being empty of robotic devices and operators.

Upon reception of request entry message 210, control system 130 can put cell 160 into "Ready RD" state 310; that is, a ready-for-robotic-device-entry state by deactivating warehouse presence sensor, as indicated in FIG. 3 using a dashed line. Then, robotic device 140 can enter cell 160. After control system 130 validates the entry of robotic device 140 using the procedures of block 222, cell 160 can be put into "RD In" state 322; that is, a robotic-device-in-cell state. Upon validation that robotic device 140 is completely within cell 160, control system 130 can send disable message 224 instructing robotic device 140 to disable itself, putting cell 160 in "RD Off" state 324, which is a state indicate that a disabled robotic device is in cell 160. Upon validation that robotic device 140 is completely within cell 160, control system 130 can also send enable message 230 to enable warehouse presence sensor 170, and cell 160 can be placed in "WPS On" state, which indicates that a disabled robotic device is in cell 160, that the warehouse presence sensor has been re-enabled. Then, control system 130 can use disable message 234 to disable operator presence sensor 176, and operator presence sensor 176 can perform the procedures of block 236 to disable itself, putting cell 160 in "OPS Off" state 330. In OPS Off State 330, cell 160 is ready for operator entry from operator area 120 of environment 100 and subsequent operator interaction with disabled robotic device 140. Further, as shown at left-center of FIG. 3, operator presence sensor 176 is illustrated with a dashed line, indicating operator presence sensor 176 is deactivated to permit entry into cell 160 from operator area 120.

FIG. 3 indicates that that control system 130 sends OK to enter cell message 240 to entry/exit signals device 182 and cell 160 is placed in the "SigOperOK" state 332 to indicate that an operator has been signaled that it is OK to enter cell 160. For example, after receiving message 240, entry/exit signals device 182 can indicate that cell 160 is ready for operator entry by sending OK to enter cell message 240 to an operator; e.g., in scenario 200, to operator 150. In other examples, entry/exit signals device 182 can indicate that cell 160 is ready for operator entry by illuminating an "OK to Enter" or similar light, providing a "OK to Enter" tone or audible speech, using a display (e.g., liquid crystal display (LCD) and/or other display technology) to display an "OK to Enter" message, etc.

When operator 150 enters cell 160, cell 160 can be in a "Work" state 340, which can be a state where an operator is able to safely interact with a disabled robotic device; e.g., operator 150 can interact with robotic device 140. Then, when the operator is done interacting with the disabled robotic device, the operator can leave cell 160 and send exited cell message 252, and so put cell 160 into an "Oper Out" 350 indicating the operator is done interacting with the robotic device and has exited the cell. Then, when entry/exit signals device 182 has sent exited cell message 254 to control system 130, cell 160 can be in a "SigOperOut" state 352 to indicate that control system 130 has been signaled that an operator; e.g., operator 150 has exited cell 160.

As shown in at lower-left of FIG. 3, after receiving exited cell message 254, control system 130 can send enable message 260 to operator presence sensor 176, and operator presence sensor 176 enable itself, also putting cell 160 in a "OPS On" state 354 where both warehouse presence sensor 170 and operator presence sensor 176 are active, and robotic device 140 is disabled within cell 160. Then, control system 130 can send disable message 264 to warehouse presence sensor 170, and warehouse presence sensor 170 can perform the procedures of block 266 to disable itself, thus putting cell 160 in a "WPS Off2" state 360 indicating that cell 160 is ready for robotic system 140 to exit.

After warehouse presence sensor 170 is disabled, control system 130 can send enable message 270 to robotic device 140 and cell 160 can accordingly be placed in "RD On" state 362, indicating that the robotic device is enabled and ready to exit the cell. Then, robotic device 140 can enable itself and perform the procedures of block 274 and exit cell 160. Once control system 130 has validated the exit of robotic device 140, cell 160 can be put into "RD Out" state 364, indicating that cell 160 is empty and warehouse presence sensor 170 is disabled. Then, control system 130 can send enable warehouse presence sensor message 280 so that warehouse presence sensor 170 can enable itself.

Once warehouse presence sensor 170 is enabled, cell 160 can be restored to empty or ready for interaction state 310, and scenario 200 can end. In some embodiments, cell 160 can be in more, fewer, and/or different states while enabling safe interaction between operators and robotic devices.

Figure 4:
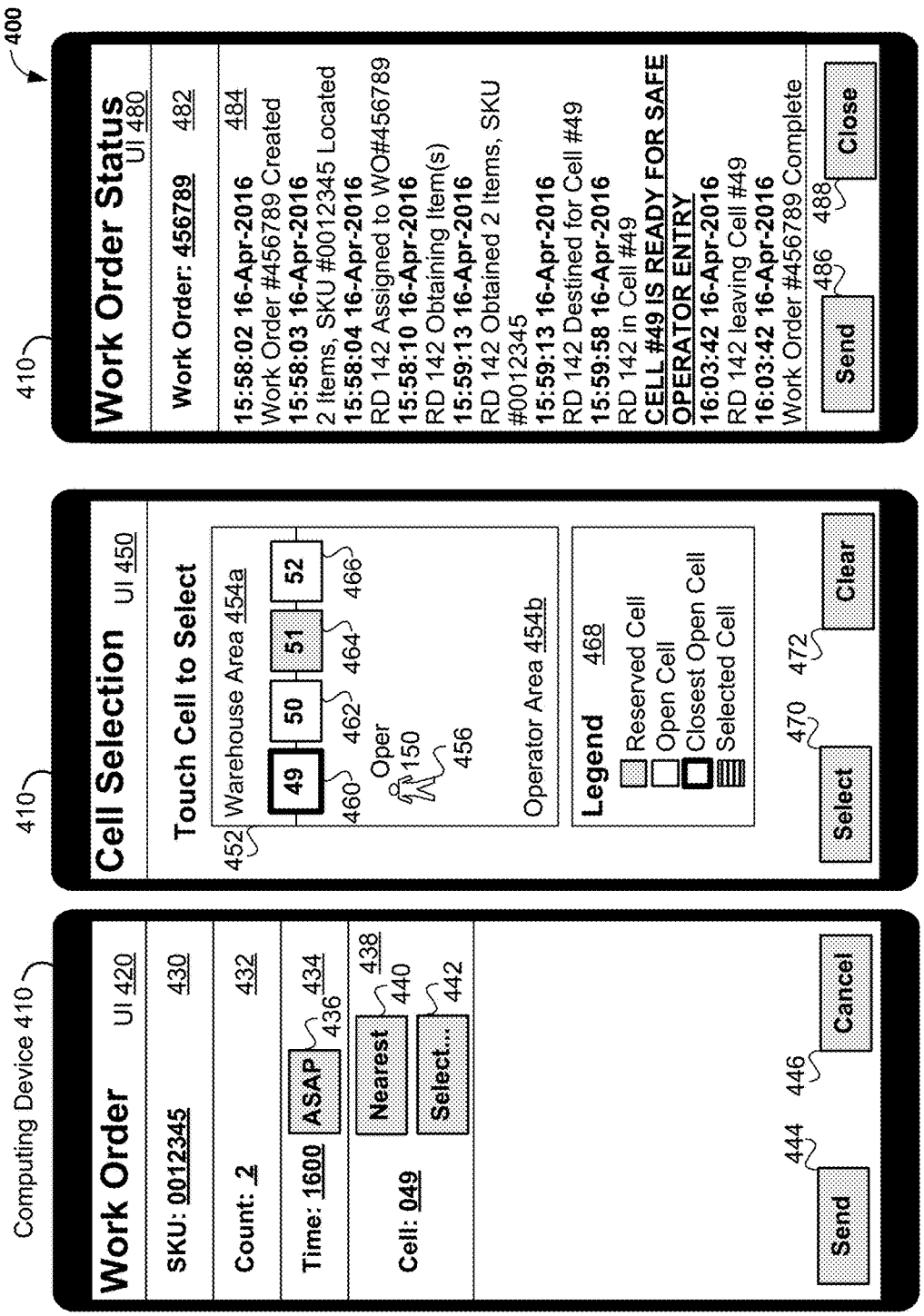
FIG. 4 shows a scenario involving example work-order-related user interfaces by an example computing device related to a work order, in accordance with an example embodiment.

FIG. 4 shows scenario 400 involving example work-order-related user interfaces 420, 450, 480 provided by computing device 410, in accordance with an example embodiment. Scenario 400 relates to a work order taking place in environment 100. As shown at left of FIG. 4, computing device 410 can display user interface 420 for work order entry. In the depicted example, the work order involves a count of "2" objects identified by a Stock Keeping Unit (SKU) code "0012345". The two objects are in warehouse area 110 of environment 100, and so are to be brought to cell to be picked up by an operator; e.g., a person using user interface 420. User interface 420 can be used to indicate that the work order involves bringing the two objects to cell "49" of environment 100 at "1600" or 4 PM.

In particular, user interface 420 include SKU entry field 430 for entering SKUs specifying objects to be delivered as part of a work order, count field 432 to indicate how many objects are to be delivered during the work order, time field 434 indicating a time that the delivery should take place, and cell field 438 indicating a cell for delivering the specified objects. The delivery can be specified to occur as soon as possible (ASAP) by selecting ASAP button 436. A cell can be specified as a nearest cell to computing device using nearest button 440 or based on a selection interface invoked using select button 442.

Once the information for a work order has been specified, send button 444 can be used to send the work order for scheduling and/or execution to a work order scheduling system. Cancel button 446 can be used to stop (cancel) a work order that has been scheduled and/or has begun execution. In other scenarios, more, fewer, and/or different fields, buttons, and/or other user interface elements can be part of user interface 420. In even other scenarios, other types of work orders; e.g., repairs, inspections, deliveries to warehouse area 110, etc. can be specified using a user interface of computing device 410.

Scenario 400 continues with select button 442 begin pressed, leading to generation and display of user interface 450 by computing device 410, where user interface 450 is shown at center of FIG. 4. User interface 450 shows diagram 452 of environment 100 divided into warehouse area 454a and operator area 454b and operator location 456 for operator "Oper 150" within operator area 454b. Diagram 452 also shows four cells: respective cells 49, 50, 51, and 52 with respective corresponding buttons 460, 462, 464, 466 of user interface 450. To select a cell for reservation, the corresponding button of user interface 450 can be pressed; e.g., to reserve cell 50, button 462 can be pressed or otherwise selected.

User interface 450 can provide information about cells depicted in diagram 452. Diagram 452 shows information about locations of the cells and the relative location to operator location 456 Legend 468 indicates that user interface 450 can indicate whether a cell is reserved, open (not reserved), and/or selected, and of the open cells which cell is nearest to operator location 456. In the example shown in FIG. 4, user interface 450 shows that cells 49, 50, and 52 are open and cell 51 is reserved, and among the open cells, cell 49 is the nearest cell to operator location 456.

Once a cell has been selected, select button 470 can be used to confirm a cell selection and close user interface 450 to return to user interface 420 to complete work order entry. In some examples, select button 470 can be used to send a request to reserve the selected cell; e.g., send the request to control system 130. Clear button 472 can be used to remove (clear out) a previously-made cell selection. In other scenarios, more, fewer, and/or different fields, buttons, and/or other user interface elements can be part of user interface 450. In even other scenarios, other types of environments that have cells available for selection can be presented using a user interface of computing device 410.

Scenario 400 continues with the selection and reservation of cell 49 for the work order. Then, send button 444 of user interface 420 is subsequently pressed to cause execution of the work order. In some embodiments, after send button 444 of user interface 420 is pressed, a work order number can be generated, and the work order number can be provided to computing device 410 for display via user interface 420 or another user interface.

Scenario 400 proceeds with a request for status information of the work order generated via user interface 420. The request for status information can be sent from computing device 410 using user interface 480.

Computing device 410 can provide user interface 480, shown at right of FIG. 4, to display a status of the work order. User interface 480 can include work order field 482 to enter a work order number (or other work order identifier). Then, once a work order number has been entered into work order field 482, send button 486 can be used to send a request for status information about the work order specified using work order field 482; e.g., send the request to the work order scheduling system. Then, the work order scheduling system can send the requested status information to computing device 410 for display using user interface 480.

In the example shown in FIG. 4, status area 484 of user interface 480 displays status for work order number "456789", as specified using work order field 482. Status area 484 shows that work order number "456789" was created on "15:58:02" on "16 Apr. 2016", that the work order involved "2" items having an SKU of "0012345", that the work order was assigned to a robotic device "RD 142", that the two items were delivered by RD 142 to "Cell #49". After delivery by RD 142 of the two items to Cell #49, the status of Cell #49 is "READY FOR SAFE OPERATOR ENTRY"; e.g., Cell #49 can be in Work state 340. Status area 484 indicates the subsequent leaving of RD 142 from Cell #49 and the eventual completion of work order 456789.

After displaying the status of work order #456789 using user interface 480, close button 488 can be pressed to close display of user interface 480 and scenario 400 can be completed.

In other scenarios, more, fewer, and/or different fields, buttons, and/or other user interface elements can be part of user interface 480. In even other scenarios, more, fewer, and/or different status information can be provided in status area 484 about work orders than in the example depicted in FIG. 4.

Computing Device Architecture

Figure 5A:
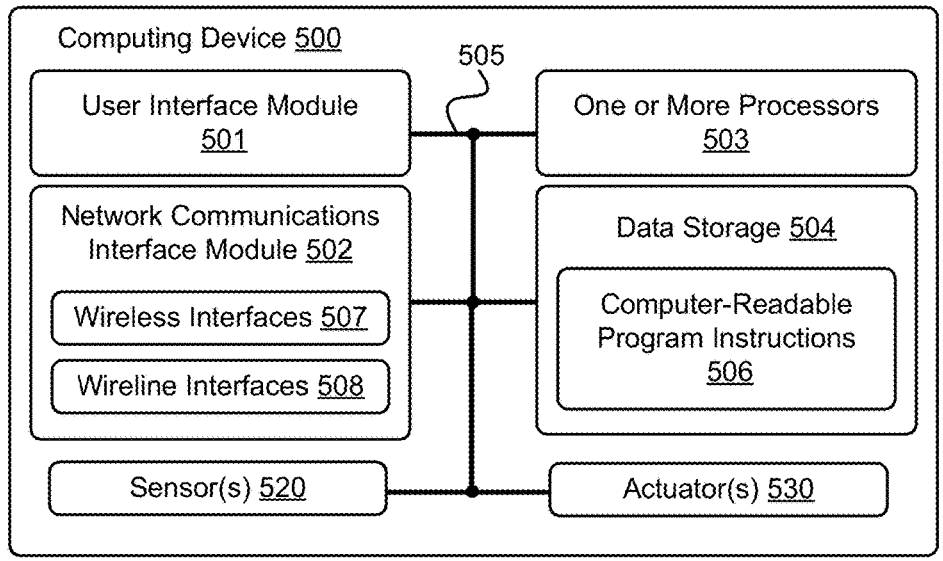
FIG. 5A is a functional block diagram of an example computing device, in accordance with an example embodiment.

FIG. 5A is a functional block diagram of computing device 500 (e.g., system, in accordance with an example embodiment. In particular, computing device 500 shown in FIG. 5A can be configured to perform at least one function of: control system 130, robotic device 140, 142, 144, operator 150, 152, computing device 410, user interfaces 420, 450, 480, network 514, one or more functions related to scenario 200 and/or method 600. Computing device 500 may include a user interface module 501, a network-communication interface module 502, one or more processors 503, data storage 504, one or more sensors 520, and one or more actuators 530, all of which may be linked together via a system bus, network, or other connection mechanism 505. In some embodiments, part or all of computing device 500 can be embodied as a programmable logic controller (PLC). In other embodiments, the computing device can be configured to act as part or all of a warehouse control system.

User interface module 501 can be operable to send data to and/or receive data from external user input/output devices. For example, user interface module 501 can be configured to send and/or receive data to and/or from user input devices such as a keyboard, a keypad, a touch screen, a computer mouse, a track ball, a joystick, a camera, a voice recognition module, and/or other similar devices. User interface module 501 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 501 can also be configured to generate audible output(s), such as a speaker, speaker jack, audio output port, audio output device, earphones, and/or other similar devices.

Network-communications interface module 502 can include one or more wireless interfaces 507 and/or one or more wireline interfaces 508 that are configurable to communicate via a network. Wireless interfaces 507 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 508 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 502 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 503 can include one or more general purpose processors, and/or one or more special purpose processors (e.g., digital signal processors, graphics processing units, application specific integrated circuits, etc.). Processors 503 can be configured to execute computer-readable program instructions 506 that are contained in the data storage 504 and/or other instructions as described herein.

Data storage 504 can include one or more computer-readable storage media that can be read and/or accessed by at least one of processors 503. The one or more computer-readable storage media can include volatile and/or non-volatile storage components, such as optical, magnetic, organic or other memory or disc storage, which can be integrated in whole or in part with at least one of processors 503. In some embodiments, data storage 504 can be implemented using a single physical device (e.g., one optical, magnetic, organic or other memory or disc storage unit), while in other embodiments, data storage 504 can be implemented using two or more physical devices.

Data storage 504 can include computer-readable program instructions 506 and perhaps additional data. In some embodiments, data storage 504 can additionally include storage required to perform at least part of the herein-described methods and techniques and/or at least part of the functionality of the devices and networks.

In some embodiments, computing device 500 can include one or more sensors 520. Sensor(s) 520 can be configured to measure conditions in an environment for computing device 500 and provide data about that environment; e.g., environment 100. For example, sensor(s) 520 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 500, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 500, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor, possibly to obtain; and (iv) a force sensor to measure one or more forces (e.g., inertial forces and/or G-forces) acting about the computing device 500, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 520 are possible as well. In some embodiments, some or all of sensors 520 can be distributed throughout an environment; e.g., identification sensors 174a, 174b dispersed throughout at least cell 160 of environment 100 such as discussed above at least in the context of FIG. 1A.

Computing device 500 can include one or more actuators 530 that enable computing device 500 to initiate movement. For example, actuator(s) 530 can include or be incorporated with robotic joints connecting robotic limbs to a robotic body. For example, actuator(s) 530 can include respective robotic hip and robotic shoulder joints connecting respective robotic legs and arms to the robotic body. Further, the actuator(s) 530 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 530 can include respective robotic ankle joints connecting the robotic legs to robotic feet and respective robotic wrist joints connecting the robotic arms to robotic hands. In addition, actuator(s) 530 can include motors for moving the robotic limbs. As such, the actuator(s) 530 can enable mobility of computing device 500. Other examples of actuator(s) 530 are possible as well.

Cloud-Based Servers

Figure 5B:
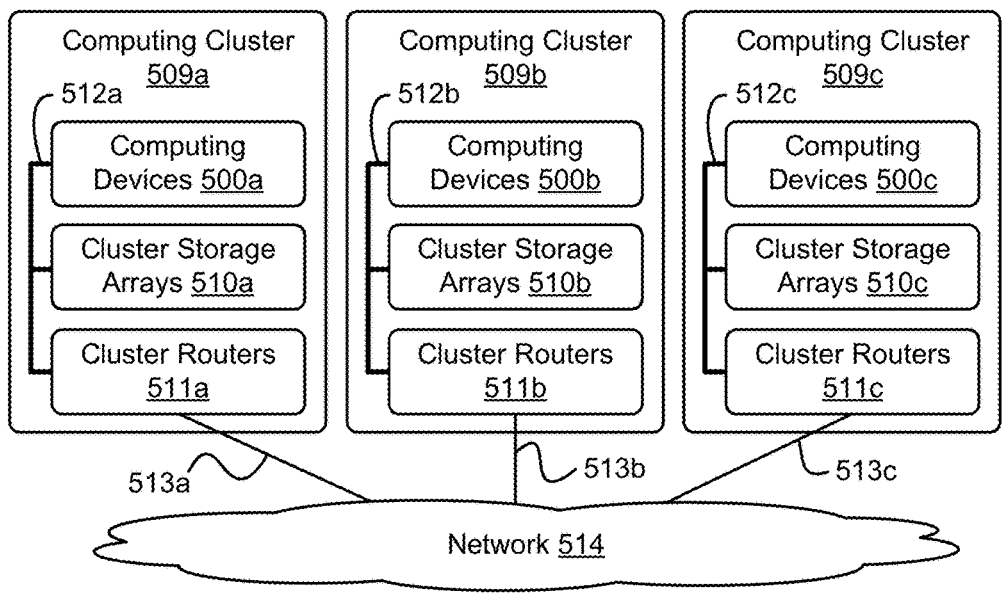
FIG. 5B depicts a network of computing clusters arranged as a cloud-based server system, in accordance with an example embodiment.

FIG. 5B depicts a network 514 of computing clusters 509a, 509b, 509c arranged as a cloud-based server system in accordance with an example embodiment. Computing clusters 509a, 509b, 509c can be cloud-based devices that store program logic and/or data of cloud-based applications and/or services; e.g., perform at least one function of: control system 130, robotic device 140, 142, 144, operator 150, 152, computing device 410 including but not limited to one or more function of user interfaces 420, 450, 480, network 514, one or more functions related to scenario 200 and/or method 600.

In some embodiments, computing clusters 509a, 509b, 509c can be a single computing device residing in a single computing center. In other embodiments, computing clusters 509a, 509b, 509c can include multiple computing devices in a single computing center, or even multiple computing devices located in multiple computing centers located in diverse geographic locations. For example, FIG. 5B depicts each of computing clusters 509a, 509b, 509c residing in different physical locations.

In some embodiments, data and services at computing clusters 509a, 509b, 509c can be encoded as computer readable information stored in non-transitory, tangible computer readable media (or computer readable storage media) and accessible by other computing devices. In some embodiments, computing clusters 509a, 509b, 509c can be stored on a single disk drive or other tangible storage media, or can be implemented on multiple disk drives or other tangible storage media located at one or more diverse geographic locations.

FIG. 5B depicts a cloud-based server system in accordance with an example embodiment. In FIG. 5B, functionality of a control system can be distributed among three computing clusters 509a, 509b, and 509c. Computing cluster 509a can include one or more computing devices 500a, cluster storage arrays 510a, and cluster routers 511a connected by a local cluster network 512a. Similarly, computing cluster 509b can include one or more computing devices 500b, cluster storage arrays 510b, and cluster routers 511b connected by a local cluster network 512b. Likewise, computing cluster 509c can include one or more computing devices 500c, cluster storage arrays 510c, and cluster routers 511c connected by a local cluster network 512c.

In some embodiments, each of the computing clusters 509a, 509b, and 509c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 509a, for example, computing devices 500a can be configured to perform various computing tasks of a control system, a safety system, robotic device, operator, and/or computing device. In one embodiment, the various functionalities of a control system, safety system, robotic device, operator, and/or computing device can be distributed among one or more computing devices 500a, 500b, and 500c. Computing devices 500b and 500c in respective computing clusters 509b and 509c can be configured similarly to computing devices 500a in computing cluster 509a. On the other hand, in some embodiments, computing devices 500a, 500b, and 500c can be configured to perform different functions.

In some embodiments, computing tasks and stored data associated with a control system, safety system, robotic device, operator, and/or computing device can be distributed across computing devices 500a, 500b, and 500c based at least in part on the processing requirements of a control system, safety system, robotic device, operator, and/or computing device, the processing capabilities of computing devices 500a, 500b, and 500c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 510a, 510b, and 510c of the computing clusters 509a, 509b, and 509c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a control system, safety system, robotic device, operator, and/or computing device can be distributed across computing devices 500a, 500b, and 500c of computing clusters 509a, 509b, and 509c, various active portions and/or backup portions of these components can be distributed across cluster storage arrays 510a, 510b, and 510c. For example, some cluster storage arrays can be configured to store one portion of the data of a control system, safety system, robotic device, operator, and/or computing device can, while other cluster storage arrays can store other portion(s) of data of a control system, safety system, robotic device, operator, and/or computing device. Additionally, some cluster storage arrays can be configured to store backup versions of data stored in other cluster storage arrays.

The cluster routers 511a, 511b, and 511c in computing clusters 509a, 509b, and 509c can include networking equipment configured to provide internal and external communications for the computing clusters. For example, the cluster routers 511a in computing cluster 509a can include one or more internet switching and routing devices configured to provide (i) local area network communications between the computing devices 500a and the cluster storage arrays 510a via the local cluster network 512a, and (ii) wide area network communications between the computing cluster 509a and the computing clusters 509b and 509c via the wide area network connection 513a to network 514. Cluster routers 511b and 511c can include network equipment similar to the cluster routers 511a, and cluster routers 511b and 511c can perform similar networking functions for computing clusters 509b and 509b that cluster routers 511a perform for computing cluster 509a.

In some embodiments, the configuration of the cluster routers 511a, 511b, and 511c can be based at least in part on the data communication requirements of the computing devices and cluster storage arrays, the data communications capabilities of the network equipment in the cluster routers 511a, 511b, and 511c, the latency and throughput of local networks 512a, 512b, 512c, the latency, throughput, and cost of wide area network links 513a, 513b, and 513c, and/or other factors that can contribute to the cost, speed, fault-tolerance, resiliency, efficiency and/or other design goals of the moderation system architecture.

Example Methods of Operation

Figure 6:
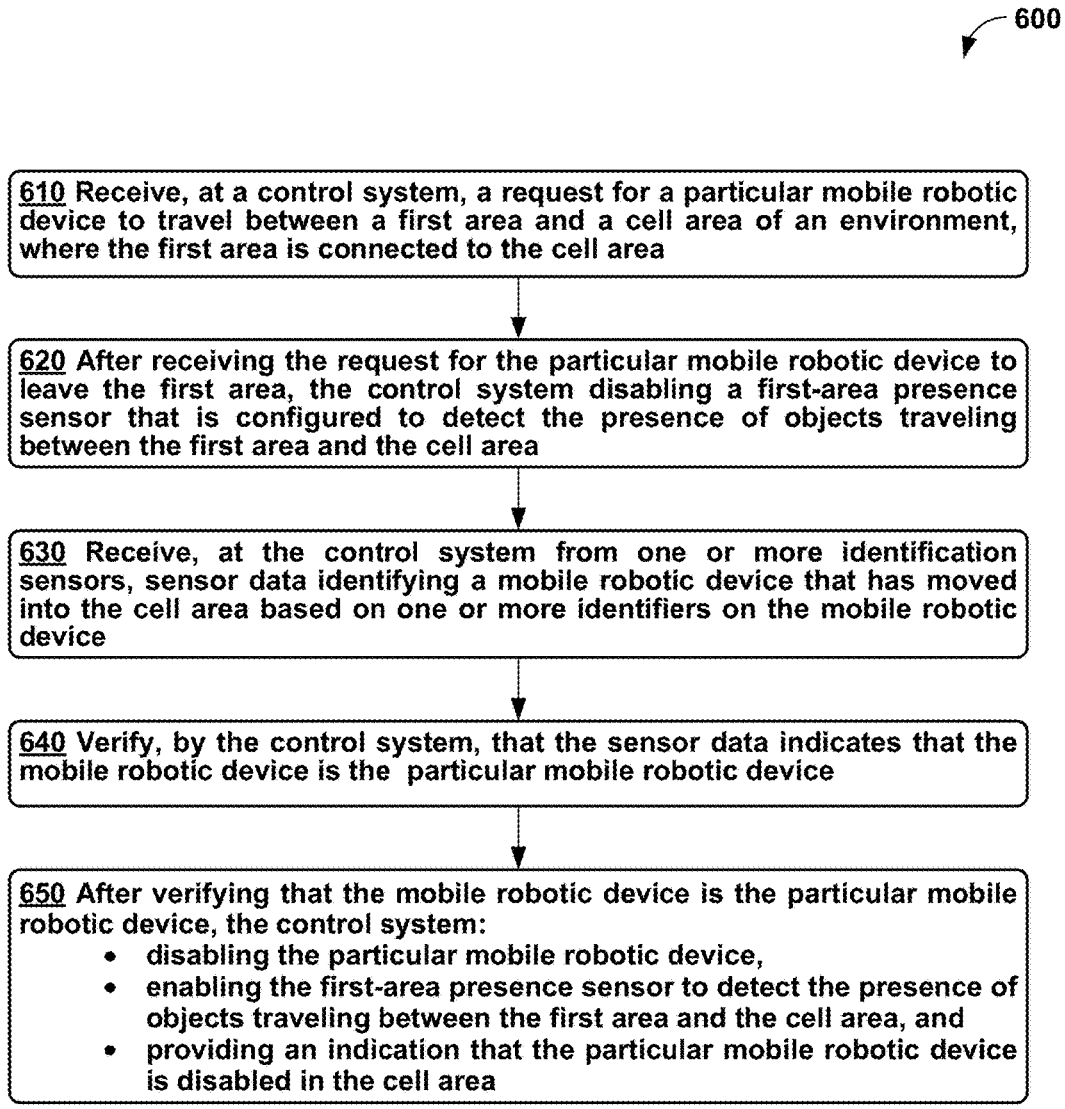
FIG. 6 is a flowchart of a method, in accordance with an example embodiment.

FIG. 6 is a flowchart of method 600, in accordance with an example embodiment. Method 600 can be executed by a control system, such as control system 130 discussed above. The control system can include a computing device, such as computing device 500—in these embodiments, the control system can use the computing device to execute at least part of method 600.

Method 600 can begin at block 610, where a control system can receive a request for a particular mobile robotic device to travel between a first area and a cell area of an environment, where the first area is connected to the cell area, such as discussed above regarding as least FIGS. 1A, 1B, 2A, and 2B. In some embodiments, the control system can include a programmable logic controller, such as discussed above in the context of at least FIG. 5A.

At block 620, the control system can, after receiving the request for the particular mobile robotic device to leave the first area, disable a first-area presence sensor that is configured to detect the presence of objects traveling between the first area and the cell area, such as discussed above regarding as least FIGS. 1A, 1B, 2A, 2B, and 3.

At block 630, the control system can receive, from one or more identification sensors, sensor data identifying a mobile robotic device that has moved into the cell area based on one or more identifiers on the mobile robotic device, such as discussed above regarding as least FIGS. 1A, 1B, 1E, 2A, 2B, and 3.

In some embodiments, the one or more identifiers can include one or more RFID devices, and the one or more identification sensors can be configured to read the one or more RFID devices, such as discussed above in the context of at least FIGS. 1E and 5A. In particular of these embodiments, the mobile robotic device can include a plurality of RFID devices that, in turn, include the one or more RFID devices. Then, method 600 can further include: determining an orientation of the mobile robotic device within the cell area based on locations of the plurality of RFID devices; and verifying that the mobile robotic device is contained within the cell area based on the orientation, such as discussed above in the context of at least FIGS. 1E and 5A. In even more particular of these embodiments, the mobile robotic device can include a pallet jack, where the pallet jack can include first and second tines. Then, the plurality of RFID devices can include a first RFID device on the first tine and a second RFID device on the second tine, such as discussed above in the context of at least FIG. 1E.

At block 640, the control system can verify that the sensor data indicates that the mobile robotic device is the particular mobile device, such as discussed above regarding as least FIGS. 1A, 1B, 1E, 2A, and 2B.

At block 650, after verifying that the mobile robotic device is the particular mobile device, the control system can: disable the particular mobile robotic device, enable the first-area presence sensor detecting the presence of objects traveling between the first area and the cell area, and provide an indication that the particular mobile robotic device is disabled in the cell area, such as discussed above regarding as least FIGS. 1A, 1B, 2A, 2B, and 3.

In some embodiments, the environment includes a second area connected to the cell area. Then, method 600 can further include: after verifying that the particular mobile robotic device is in the cell area, the control system: disabling a second-area presence sensor configured to detect the presence of objects traveling between the second area and the cell area, such as discussed above regarding as least FIGS. 1A, 1B, 2A, 2B, and 3. In particular of these embodiments, method 600 can further include: receiving, at the control system, an indication that the particular mobile robotic device is to be enabled, and that the control system, after receiving the indication that the particular mobile robotic device is to be enabled, can be for: enabling the second-area presence sensor, disabling the first-area presence sensor, and enabling the particular mobile robotic device, such as discussed above regarding as least FIGS. 1A, 1B, 2A, 2B, and 3. In more particular of these embodiments, method 600 can further include: after enabling the particular mobile robotic device, receiving, at the control system from the one or more identification sensors, additional sensor data indicating that the particular mobile robotic device is not in the cell area, and enabling the first-area presence sensor based on the additional sensor data, such as discussed above regarding as least FIGS. 1A, 1B, 2A, 2B, and 3.

In other particular of these embodiments, the first-area presence sensor can include a first light curtain and the second-area presence sensor can include a second light curtain, such as discussed above regarding as least FIGS. 1A-3. In still other particular of these embodiments, the indication that that particular mobile robotic device is disabled in the cell area can include an indication that entry into the cell area from the second area is permitted, such as discussed above regarding as least FIGS. 1C, 2B, and 3. In more particular of the still other particular embodiments, the indication that entry into the cell area from the second area is permitted can be received at a cell entry/exit signaling device in the second area, the cell entry/exit signaling device can be configured to generate an output within the second area upon reception of the indication that entry into the cell area from the second area is permitted; and the cell entry/exit signaling device can be configured to provide the indication that the particular mobile robotic device is to be enabled, such as discussed above regarding as least FIGS. 1C, 2B, and 3.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving, at a control system, a request for a first mobile robotic device to travel between a first area and a cell area of an environment, wherein the first area is connected to the cell area;
after receiving the request for the first mobile robotic device to travel between the first area and the cell area, the control system disabling a first-area presence sensor that is configured to detect presence of objects traveling between the first area and the cell area;
receiving, at the control system from one or more identification sensors, sensor data identifying a second mobile robotic device that has moved into the cell area based on one or more identifiers on the second mobile robotic device;
verifying, by the control system, that the sensor data indicates that the second mobile robotic device is the first mobile device; and
after verifying that the second mobile robotic device is the first mobile device, the control system:
disabling the first mobile robotic device,
enabling the first-area presence sensor to detect the presence of objects traveling between the first area and the cell area, and
providing an indication that the first mobile robotic device is disabled in the cell area.

2. The method of claim 1, wherein the environment comprises a second area connected to the cell area, and wherein the method further comprises:
after verifying that the second mobile robotic device is the first mobile device, the control system disabling a second-area presence sensor that is configured to detect the presence of objects traveling between the first area and the cell area.

3. The method of claim 2, further comprising:
receiving, at the control system, an indication that the first mobile robotic device is to be enabled; and
after receiving the indication that the first mobile robotic device is to be enabled, the control system:
enabling the second-area presence sensor,
disabling the first-area presence sensor, and
enabling the first mobile robotic device.

4. The method of claim 3, further comprising:
after enabling the first mobile robotic device:
receiving, at the control system from the one or more identification sensors, additional sensor data indicating that the first mobile robotic device is not in the cell area, and
enabling the first-area presence sensor based on the additional sensor data.

5. The method of claim 2, wherein the first-area presence sensor comprises a first light curtain and the second-area presence sensor comprises a second light curtain.

6. The method of claim 2, wherein the indication that that the first mobile robotic device is disabled in the cell area comprises an indication that entry into the cell area from the second area is permitted.

7. The method of claim 6, wherein the indication that entry into the cell area from the second area is permitted is received at a cell entry/exit signaling device in the second area,
wherein the cell entry/exit signaling device is configured to generate an output within the second area upon reception of the indication that entry into the cell area from the second area is permitted; and
wherein the cell entry/exit signaling device is configured to provide the indication that the first mobile robotic device is to be enabled.

8. The method of claim 1, wherein the control system comprises a programmable logic controller (PLC).

9. The method of claim 1, wherein the one or more identifiers comprise one or more Radio Frequency ID (RFID) devices, and wherein the one or more identification sensors are configured to read the one or more RFID devices.

10. The method of claim 9, wherein the second mobile robotic device comprises a plurality of RFID devices that include the one or more RFID devices, and wherein the method further comprises:
determining an orientation of the second mobile robotic device within the cell area based on locations of the plurality of RFID devices; and
verifying that the second mobile robotic device is contained within the cell area based on the orientation.

11. The method of claim 10, wherein the second mobile robotic device comprises a pallet jack that includes first and second tines, wherein the plurality of RFID devices comprise a first RFID device on the first tine and a second RFID device on the second tine.

12. A control system, comprising:
one or more identification sensors; and
a computing device, comprising:
one or more processors; and
data storage including at least computer-executable instructions stored thereon that, when executed by the one or more processors, cause the control system to perform functions comprising:
receiving a request for a first mobile robotic device to travel between a first area and a cell area of an environment, wherein the first area is connected to the cell area;
after receiving the request for the first mobile robotic device to travel between the first area and the cell area, disabling a first-area presence sensor configured to detect presence of objects traveling between the first area and the cell area;
receiving, from the one or more identification sensors, sensor data identifying a mobile robotic device that has moved into the cell area based on one or more identifiers on the second mobile robotic device;
verifying that the sensor data indicates that the second mobile robotic device is the first mobile device; and
after verifying that the first mobile robotic device is the particular mobile device:
disabling the first mobile robotic device,
enabling the first-area presence sensor detecting the presence of objects traveling between the first area and the cell area, and
providing an indication that the first mobile robotic device is disabled in the cell area.

13. The control system of claim 12, wherein the environment comprises a second area connected to the cell area, and wherein the functions further comprise:
after verifying that the second mobile robotic device is the first mobile device, disabling a second-area presence sensor that is configured to detect the presence of objects traveling between the first area and the cell area.

14. The control system of claim 13, wherein the functions further comprise:
receiving an indication that the first mobile robotic device is to be enabled; and
after receiving the indication that the first mobile robotic device is to be enabled, the control system:
enabling the second-area presence sensor,
disabling the first-area presence sensor, and
enabling the first mobile robotic device.

15. The control system of claim 14, wherein the functions further comprise:
after enabling the first mobile robotic device:
receiving, from the one or more identification sensors, additional sensor data indicating that the first mobile robotic device is not in the cell area, and
enabling the first-area presence sensor based on the additional sensor data.

16. The control system of claim 14, wherein the first-area presence sensor comprises a first light curtain and the second-area presence sensor comprises a second light curtain.

17. The control system of claim 12, wherein the control system further comprises a programmable logic controller (PLC).

18. The control system of claim 12, wherein the one or more identifiers comprise a plurality of Radio Frequency ID (RFID) devices, wherein the one or more identification sensors are configured to read the one or more RFID devices.

19. The control system of claim 18, wherein the second mobile robotic device comprises a plurality of RFID devices that include the one or more RFID devices, and wherein the functions further comprise:
determining an orientation of the second mobile robotic device within the cell area based on locations of the plurality of RFID devices, and
verifying that the second mobile robotic device is contained within the cell area based on the orientation.

20. A non-transitory computer readable medium having stored thereon instructions, that when executed by one or more processors of a computing device, cause the computing device to perform functions comprising:
receiving a request for a first mobile robotic device to travel between a first area and a cell area of an environment, wherein the first area is connected to the cell area;
after receiving the request for the first mobile robotic device to travel between the first area and the cell area, disabling a first-area presence sensor configured to detect presence of objects traveling between the first area and the cell area;
receiving, from one or more identification sensors, sensor data identifying a mobile robotic device that has moved into the cell area based on one or more identifiers on the second mobile robotic device;
verifying that the sensor data indicates that the second mobile robotic device is the first mobile device; and
after verifying that the second mobile robotic device is the first mobile device:
disabling the first mobile robotic device,
enabling the first-area presence sensor to detect the presence of objects traveling between the first area and the cell area, and
providing an indication that the first mobile robotic device is disabled in the cell area.

* * * * *